(12) United States Patent
Sweet et al.

(10) Patent No.: US 9,243,519 B2
(45) Date of Patent: Jan. 26, 2016

(54) SYSTEMS AND METHODS FOR ACCELERATING DROOP RESPONSE TO FREQUENCY VARIATION OF AN ELECTRICAL GRID IN A COMBINED CYCLE POWER PLANT

(75) Inventors: Bryan Edward Sweet, Schenectady, NY (US); Yuhui Chen, Salem, VA (US)

(73) Assignee: General Electric Company, Schenectady, NY (US)

( * ) Notice: Subject to any disclaimer, the term of this patent is extended or adjusted under 35 U.S.C. 154(b) by 577 days.

(21) Appl. No.: 13/605,288

(22) Filed: Sep. 6, 2012

(65) Prior Publication Data
US 2014/0060065 A1 Mar. 6, 2014

(51) Int. Cl.
*F01K 23/10* (2006.01)
*F02C 6/18* (2006.01)
*F02C 9/28* (2006.01)

(52) U.S. Cl.
CPC ............... *F01K 23/101* (2013.01); *F02C 6/18* (2013.01); *F02C 9/28* (2013.01); *F05D 2220/72* (2013.01); *F05D 2270/061* (2013.01); *F05D 2270/20* (2013.01); *F05D 2270/335* (2013.01); *Y02E 20/16* (2013.01)

(58) Field of Classification Search
CPC .......... F05D 2270/06; F05D 2270/061; F05D 2270/335; F05D 2220/72; F01K 23/10; F01K 23/101; F01K 23/105; F01K 23/108; F02C 6/18; F02C 9/26; F02C 9/28; F02C 9/32
See application file for complete search history.

(56) References Cited

U.S. PATENT DOCUMENTS

| | | | | | |
|---|---|---|---|---|---|
| 4,208,591 | A | * | 6/1980 | Yannone et al. | 290/40 R |
| 4,550,565 | A | * | 11/1985 | Ozono | 60/39.182 |
| 5,555,719 | A | * | 9/1996 | Rowen et al. | 60/773 |
| 5,761,895 | A | * | 6/1998 | Chu et al. | 60/773 |
| 6,250,877 | B1 | * | 6/2001 | Westphal et al. | 415/17 |
| 6,609,361 | B2 | * | 8/2003 | Vugdelija | 60/39.182 |
| 2002/0108366 | A1 | * | 8/2002 | Saitoh et al. | 60/39.182 |
| 2004/0159105 | A1 | * | 8/2004 | Tanaka et al. | 60/773 |
| 2008/0095294 | A1 | * | 4/2008 | Andrew et al. | 376/210 |
| 2009/0112374 | A1 | * | 4/2009 | Kirchhof et al. | 700/287 |
| 2009/0277183 | A1 | * | 11/2009 | Guzman et al. | 60/773 |
| 2014/0345278 | A1 | * | 11/2014 | Pickard et al. | 60/645 |

OTHER PUBLICATIONS

Kehlhofer, Rolf Rukes, Bert Hannemann, Frank Stirnimann, Franz. (2009). Combined-Cycle Gas and Steam Turbine Power Plants (3rd Edition). PennWell. p. 217. Online version available at: http://app.knovel.com/hotlink/toc/id:kpCCGSTPP1/combined-cycle-gas-steam/combined-cycle-gas-steam.*

* cited by examiner

*Primary Examiner* — Phutthiwat Wongwian
*Assistant Examiner* — Marc Amar
(74) *Attorney, Agent, or Firm* — Sutherland Asbill & Brennan LLP (57) ABSTRACT

According to one embodiment of the disclosure, a system for accelerating droop response in a combined cycle power plant may include a controller and a processor communicatively coupled to the controller. The processor may be configured to receive frequency variation data associated with a frequency variation of an electrical grid, determine, based at least in part on the frequency variation data, a target operational level of the combined cycle power plant and the droop response associated with the target operational level, calculate a variable compensation value, and apply the variable compensation value to the droop response until the target operational level is reached.

19 Claims, 8 Drawing Sheets

FIG. 8

SYSTEMS AND METHODS FOR ACCELERATING DROOP RESPONSE TO FREQUENCY VARIATION OF AN ELECTRICAL GRID IN A COMBINED CYCLE POWER PLANT

TECHNICAL FIELD

This disclosure relates generally to combined cycle power plants, and more particularly to systems and methods for accelerating droop response in a combined cycle power plant.

BACKGROUND

Combined cycle power plants have demonstrated high thermal efficiency, reliability, and cost-effective power generation. A combined cycle power plant may include a combustion turbine, a steam generator, and a steam turbine. The steam turbine of a combined cycle power plant is powered by the steam generated by the hot exhaust of the combustion turbine in the steam generator.

This design results in different response times of the combustion and steam turbines. Whereas an increase in fuel supply to the combustion turbine may result in a nearly instantaneous corresponding power increase in the combustion turbine, the corresponding response of the steam turbine is delayed until the fuel is burned, and the steam is produced. Consequently, a combined cycle power plant may experience overall delays due to the delay of the bottoming cycle (steam turbine). In some situations, an increase in the frequency of a combined cycle power plant needs to satisfy primary frequency response requirements. To comply with the primary frequency response requirements, the combined cycle power plant operators may discount the steam turbine contribution altogether during frequency transitions. This approach may result in inefficient fuel consumption and stress on the overall combined cycle power plant operations.

BRIEF DESCRIPTION OF THE DISCLOSURE

The present disclosure relates to systems and methods for accelerating droop response in a combined cycle power plant. According to one embodiment of the disclosure, a system is provided. The system may include a controller and a processor in communication with the controller. The processor may be configured to receive frequency variation data associated with a frequency variation of an electrical grid and, based on the frequency variation data, determine a target operational level of the combined cycle power plant and the droop response associated with the target operational level and calculate a variable compensation value. When the variable compensation value is calculated, the processor may apply the variable compensation value to the droop response until the target operational level is reached.

In another embodiment of the disclosure, a method is provided. The method may include receiving frequency variation data associated with a frequency variation of an electrical grid, determining a target operational level of the combined cycle power plant and the droop response associated with the target operational level based on the frequency variation data, and calculating a variable compensation value. The calculated variable compensation value may be applied to the droop response until the target operational level is reached.

In yet another embodiment of the disclosure, another system is provided. The system may include a gas turbine, a steam turbine, a generator, a controller in communication with a droop governor and a droop response accelerator, and a processor in communication with the controller. The processor may be configured to receive frequency variation data associated with a frequency variation, filter the frequency variation data using a dead band based on a predetermined value, determine a target operational level of the gas turbine and steam turbine based on the frequency variation data, and calculate a transient bias for compensation of a delayed response of the steam turbine. The transient bias may be generated based on the calculation and combined with a signal representing operation of the gas turbine and steam turbine until the target operational level is reached.

Other embodiments and aspects will become apparent from the following description taken in conjunction with the following drawings.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The embodiments described herein relate to systems and methods for accelerating droop response in a combined cycle power plant. Certain embodiments can provide for accelerating droop response in a combined cycle power plant by using the ability of a gas turbine to quickly increase power output, thus compensating the delay of the steam cycle of a combined cycle power plant.

In many locations, electrical grid authorities regulate electrical grids to assure a certain frequency in the grid. Some events, such as an insufficiency in power generation or major disturbances of the grid, may cause imbalances between the power supply and the load of the grid. When the imbalances occur, the grid frequency may drop. In such circumstances, the balance may be restored by increasing power generation, which is known as frequency response. Depending on time frames, the frequency response may be of various types, such as primary response or governor response. To comply with the requirements of various grid authorities, the primary response may need to provide a specific power increase within a certain time frame (for example, 1-10 seconds). Since response of the steam cycle in a combined cycle power plant has an inherent time delay, it may be difficult to comply with grid authority requirements related to the primary frequency response.

During grid events, when frequency varies, a target operational level of the combined cycle power plant and the droop response associated with the target operational level may be determined based on the frequency variations. Based on the target operational level, a variable compensation value may be calculated and applied to the droop response so that the combined cycle power plant can reach the target operational level. As the power level is increased, the overall combined cycle droop gain is adjusted to compensate for the steam cycle's delayed response to the frequency variations. Thus, the power output of a combined cycle power plant may be increased to meet specific requirements (for example, requirements by electrical grid authorities, state requirements, and the like), while maintaining overall operational efficiency.

According to various embodiments of the disclosure, the power response capability of a combined cycle power plant may be improved by using the ability of a gas turbine to provide a fast primary response to frequency events. To compensate for the delay of the steam cycle in a combined cycle power plant, a gas turbine power output may be increased during grid events. Correspondingly, the primary frequency response of the combined cycle power plant may be accelerated so that the grid authority requirements related to the primary frequency response are fulfilled.

In certain example embodiments, the variable compensation value calculated and applied to the droop response may comprise a transient bias. The transient bias may compensate for the inherent time delayed response of the steam cycle to frequency variations, thereby allowing the droop target to be achieved throughout the response range defined by the grid authority.

In certain example embodiments, a dead band may be used to filter out insignificant frequency variations from frequency events to avoid a combined cycle power plant responding to minor frequency events.

The technical effects of certain embodiments of the disclosure may include improving the response of a combined cycle power plant to frequency events by variably compensating for the delays in the response of the bottoming cycle.

The following provides the detailed description of various example embodiments related to systems and methods for accelerating droop response in a combined cycle power plant.

Figure 1:
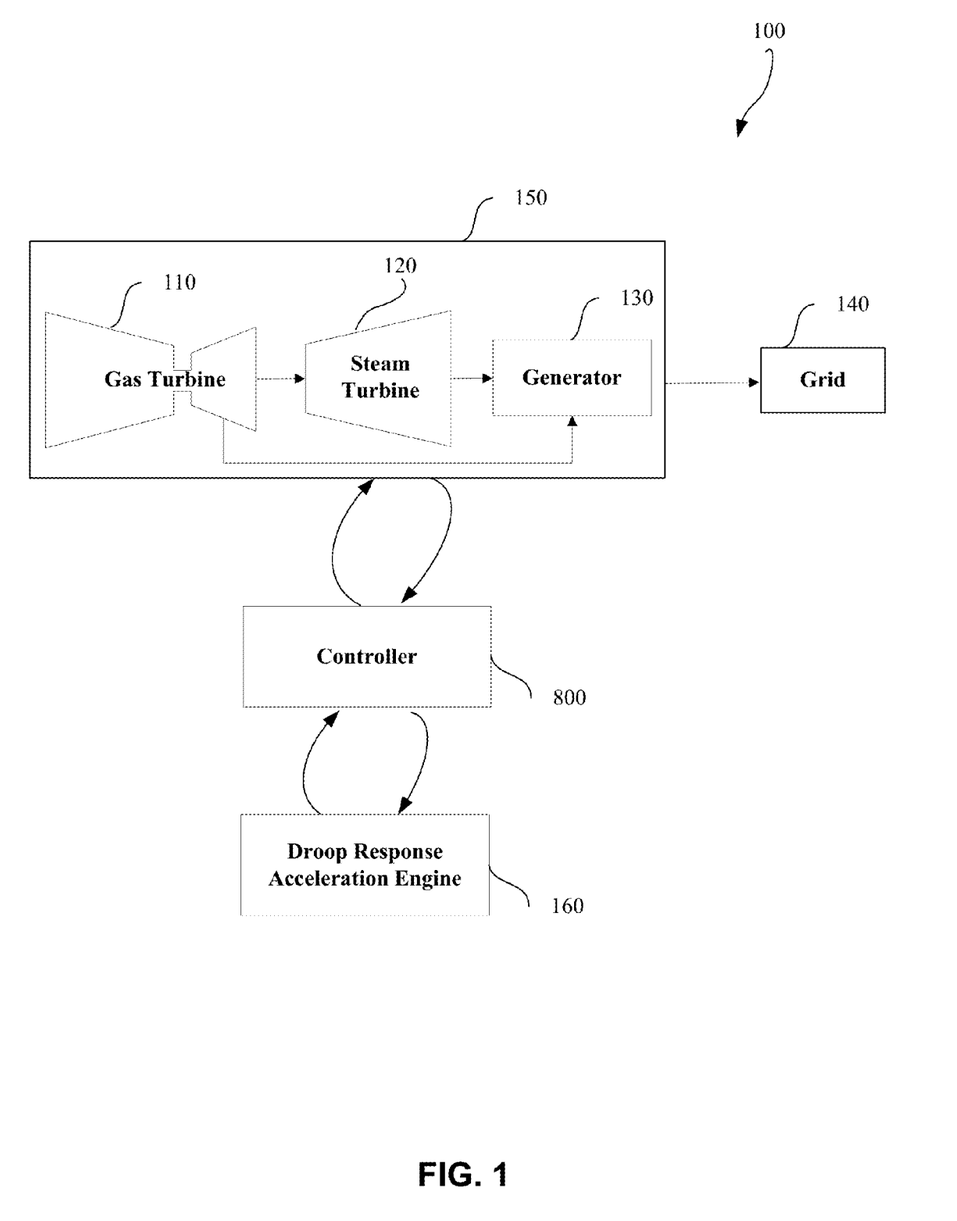
FIG. 1 is a block diagram illustrating an example environment and system for accelerating droop response in a combined cycle power plant, in accordance with an embodiment of the disclosure.

Referring now to FIG. 1, a block diagram illustrates a system environment 100 suitable for implementing a method for accelerating droop response in a combined cycle power plant, in accordance with one or more example embodiments. In particular, the system environment 100 may comprise a gas turbine 110, a steam turbine 120, a generator 130, a grid 140, a controller 800, and a droop response acceleration engine 160.

The gas turbine 110 and the steam turbine 120 may be coupled to the generator 130. The generator 130 may be then coupled to the grid 140 and provide a supply of electricity to the grid 140. The grid 140 may include distribution systems known in the art.

The gas turbine 110, the steam turbine 120, and the generator 130 may comprise a combined cycle power plant 150. Hot exhaust from the gas turbine 110 may power the steam turbine 120.

The operation of the combined cycle power plant 150 may be managed through the controller 800. The controller 800 may interact with the droop response acceleration engine 160 and the grid 140 to receive frequency variation data associated with a variation of frequency of the grid 140; filter the frequency variation data using a dead band based on a predetermined value; determine, based on the frequency variation data, a target operational level of the gas turbine 110 and the steam turbine 120; and calculate a transient bias for compensation of a delayed response of the steam turbine 120. When calculated, the transient bias may be generated and combined with a droop governor signal representing operation of the gas turbine 110 and the steam turbine 120. The transient bias may be generated throughout the duration of a grid event, until the target operational level is reached, and the balance between power plant generation and load is restored.

Figure 2:
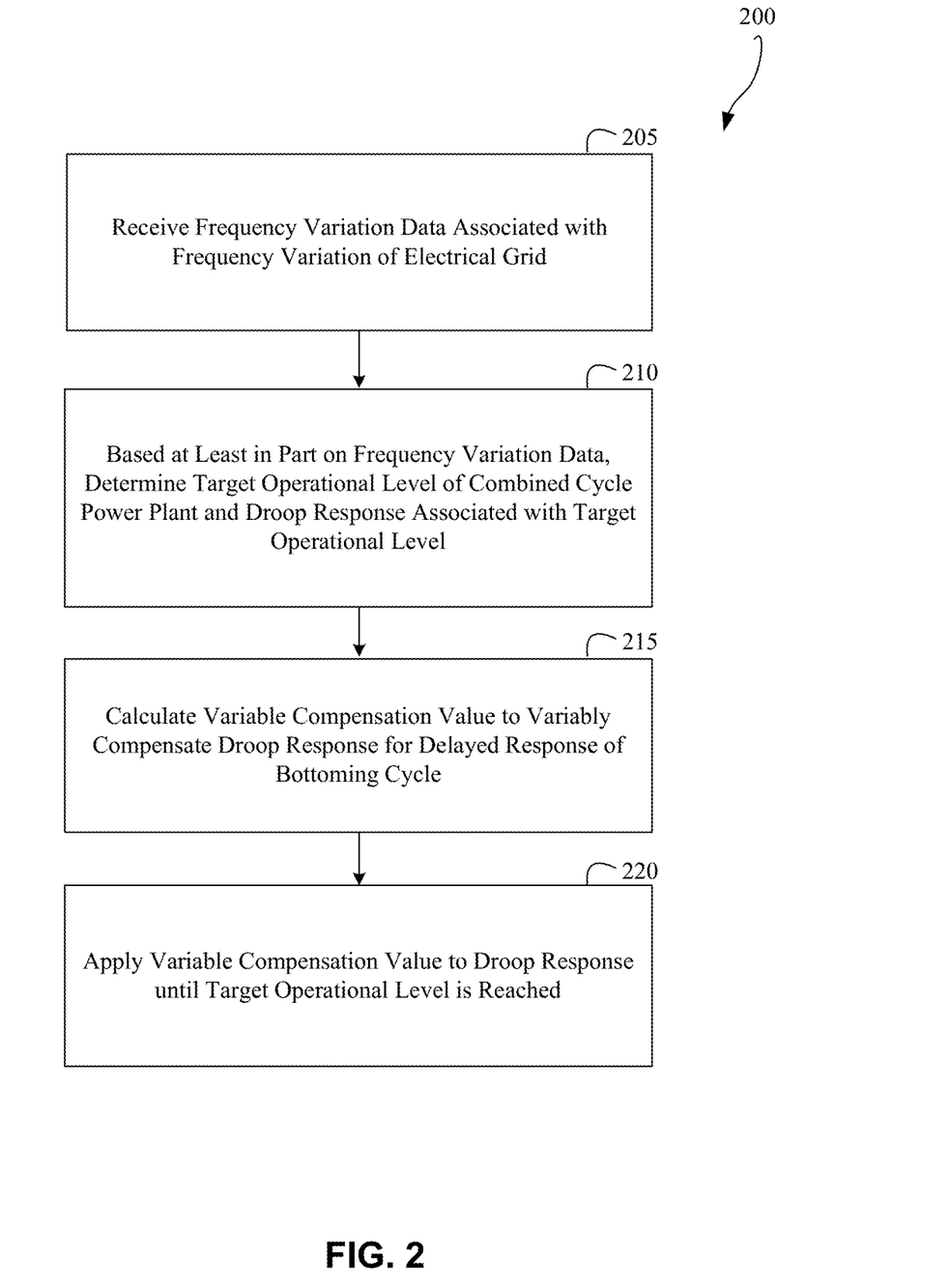
FIG. 2 is a process flow diagram illustrating an example method for accelerating droop response in a combined cycle power plant, in accordance with an embodiment of the disclosure.

FIG. 2 depicts a process flow diagram illustrating an example method 200 for accelerating droop response in a combined cycle power plant, in accordance with an embodiment of the disclosure. The method 200 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the controller 800, which may reside in a user device or in a server. The controller 800 may comprise processing logic. It will be appreciated by one of ordinary skill in the art that instructions said to be executed by the controller 800 may, in fact, be retrieved and executed by one or more processors. The controller 800 may also include memory cards, servers, and/or computer disks. Although the controller 800 may be configured to perform one or more steps described herein, other control units may be utilized while still falling within the scope of various embodiments.

As shown in FIG. 2, the method 200 may commence at operation 205 with receiving frequency variation data associated with a frequency variation of the grid 140. Frequency variations may be caused by events such as insufficient available generation or major electrical disturbances (for example, a fault on a circuit, loss of a major load, or trip of a major generator, and so forth). To control frequency variations, power generation may be increased (frequency response).

At operation 210, the level of power generation increase or a target operational level of the combined cycle power plant 150 may be determined. At the same operation, a droop response associated with the target operational level may be determined.

In some example embodiments, the frequency variation data may be filtered out using a dead band to account for allowable variations of frequency. Allowable variations may be represented by a predetermined value set for the dead band. The variations that do not exceed the predetermined value may be filtered out and not used to determine the target operational level of the combined cycle power plant 150 at operation 210.

At operation 215, a variable compensation value may be calculated to variably compensate a delayed response of a bottoming cycle of the combined cycle power plant 150.

At operation 220, the variable compensation value may be applied to the droop response until the target operational level is reached.

Figure 3:
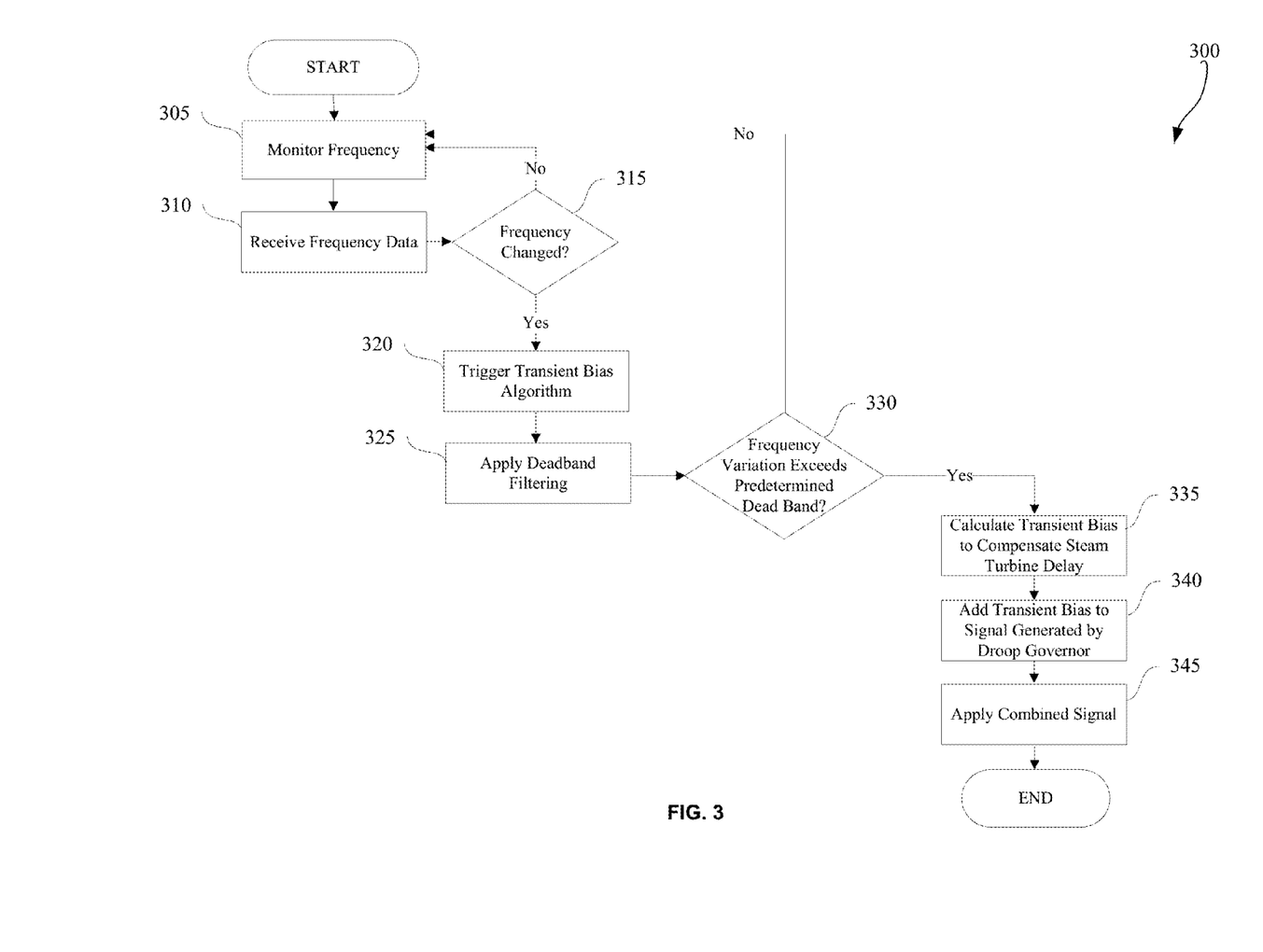
FIG. 3 is a process flow diagram illustrating an example method for accelerating droop response in a combined cycle power plant, in accordance with an embodiment of the disclosure.

FIG. 3 depicts a process flow diagram illustrating a detailed example method 300 for accelerating droop response in a combined cycle power plant, in accordance with an embodiment of the disclosure.

The method 300 may start with monitoring frequency of the grid 140 at step 305. At step 310, frequency data may be received and, at step 315, it may be determined whether the frequency has changed. If the frequency remains unchanged, frequency monitoring and receiving frequency data may continue. However, if the frequency has changed, the transient bias algorithm may be triggered at step 320. According to some embodiments, a deadband filtering may be applied to the frequency variations at step 325 to filter out frequency variations based on a predetermined value. At step 330, it may be determined whether the frequency variation exceeds the predetermined value set for the deadband filtering. If the frequency variation does not exceed the predetermined value set for the deadband filtering, the method may proceed to step 305. However, if the frequency variation exceeds the predetermined value set for the deadband filtering, the frequency variation may be used to calculate a transient bias to compensate a steam turbine delay at step 335. After that, at step 340, the transient bias may be added to a signal generated by a droop signal and, at step 345, the combined signal may be applied to control the operation of the combined cycle power plant 150. Applying the combined signal may compensate for the inherent time delayed response of the steam cycle to frequency variations, thus allowing the droop target to be achieved throughout the response range defined by the grid authority.

Figure 4:
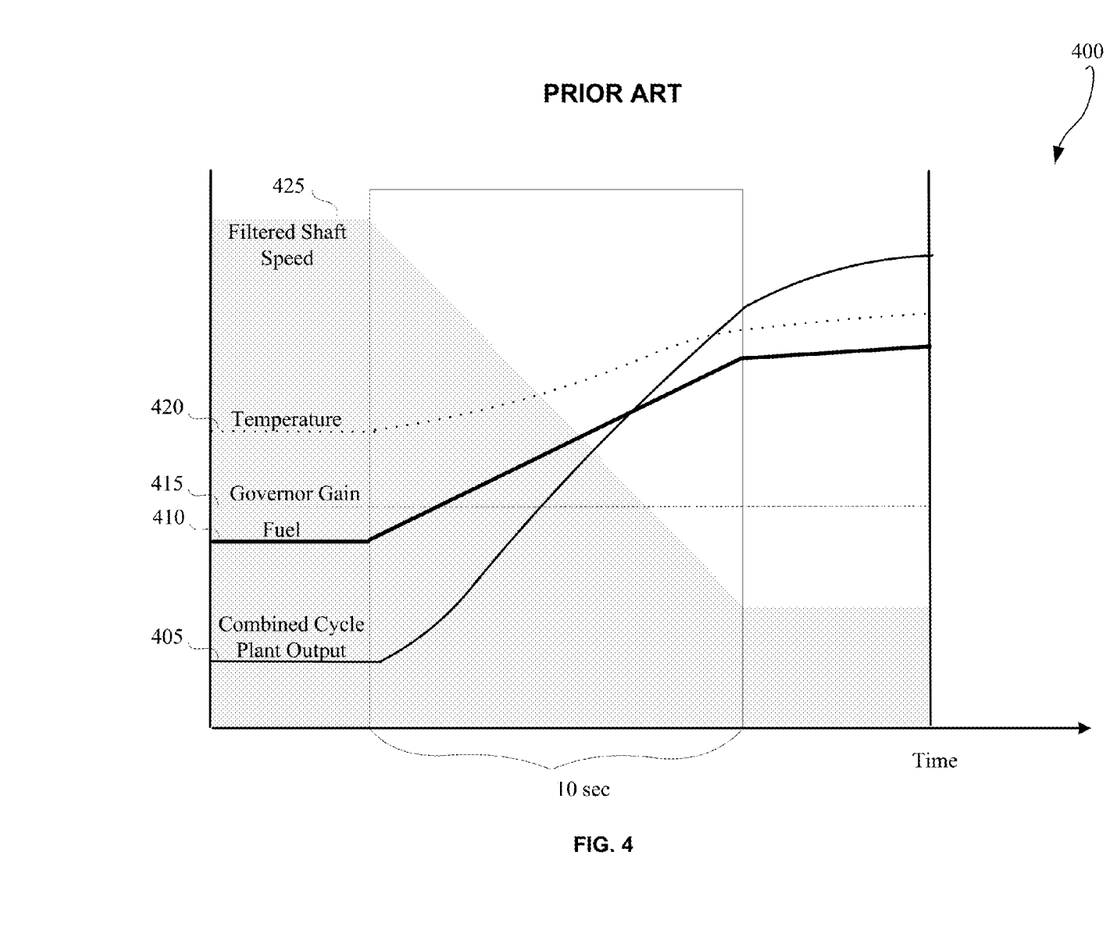
FIG. 4 illustrates example parameter variations during a frequency change without a compensation signal, in accordance with an embodiment of the disclosure.

FIG. 4 depicts a representation of example parameter variations during a frequency change without adding a compensation signal 400. When grid frequency drops, and a filtered shaft speed 425 decreases, a combined cycle plant output 405 may be increased to restore frequency to a desired level. To achieve this, a fuel flow 410 may be increased, while a governor gain 415 remains constant. In this case, a gradual increase of the combined cycle plant output 405 accompanied by a slight increase of a temperature 420 may be observed.

Figure 5:
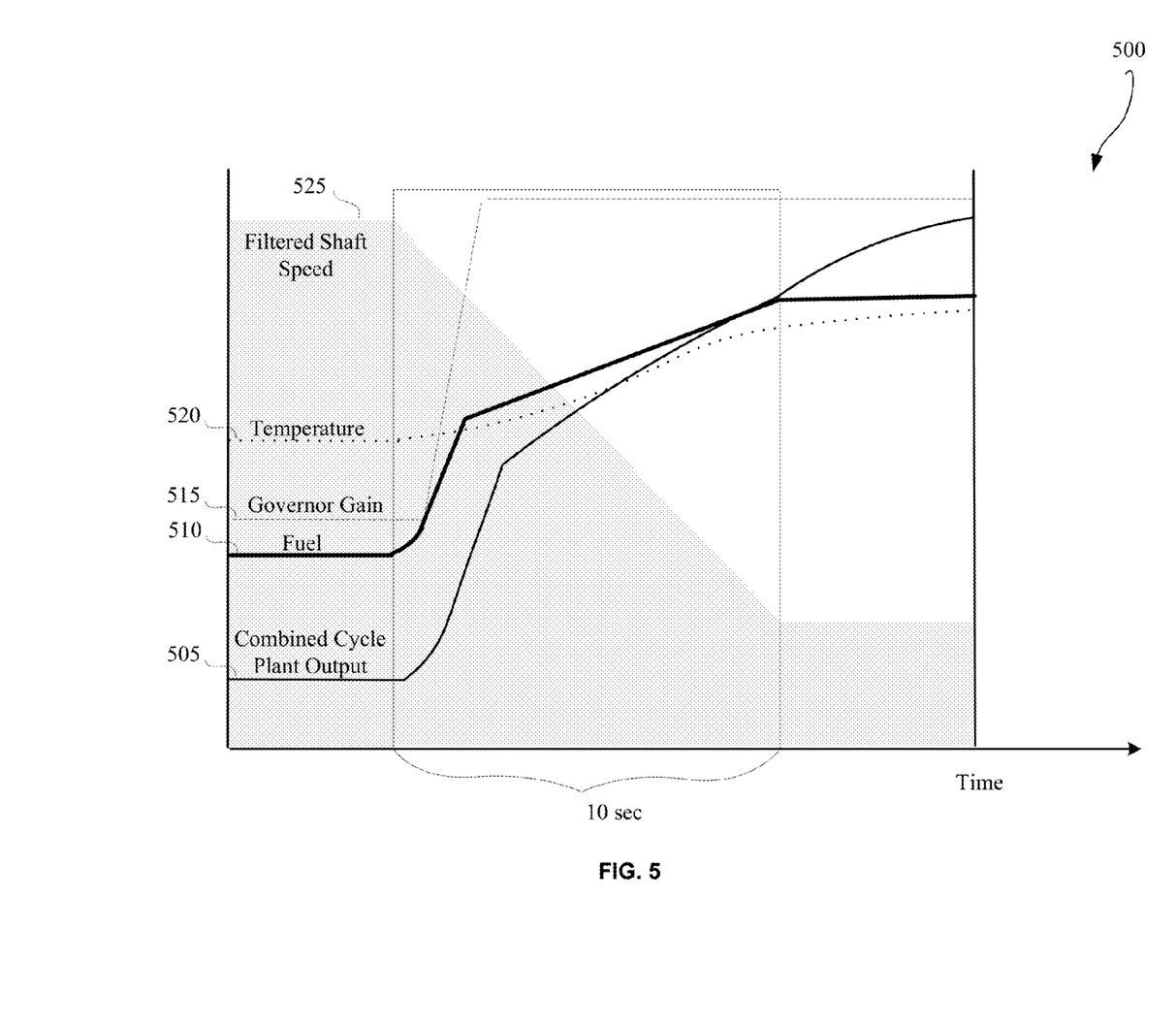
FIG. 5 illustrates example parameter variations during a frequency change with a compensation signal, in accordance with an embodiment of the disclosure.

FIG. 5 depicts a representation of example parameter variations during a frequency change while adding a compensation signal 500, in accordance with an embodiment of the disclosure. During grid events, when grid frequency drops, and a filtered shaft speed 525 decreases, a combined cycle plant output 505 may be increased to restore frequency to a desired level. To reach a target operational level corresponding to a desired level of frequency, a droop response associated with the target operational level may be determined in accordance with a variation of the filtered shaft speed 525.

In some example embodiments, variations of grid frequency may pass through a dead band to filter out minor variations. The variations that were not filtered out by the dead band may be used to determine the target operational level of the combined cycle power plant and the droop response associated with the target operational level. Based on the calculation, the compensation signal may be generated by a droop governor of the combined cycle power plant 150 and added to a standard signal generated by the droop governor. The combined signal may be applied to the combined cycle power plant.

As a result of applying the combined signal, a fuel flow 510 may be increased while increasing a governor gain 515. In this case, the combined cycle plant output 505 may quickly rise, resulting in a higher temperature 520 increase and a higher combined cycle plant output 505 within a predefined period of time (for example, 10 seconds) in comparison to the combined cycle plant output 405 without adding a compensation signal. Thus, adding the compensation signal allows reaching the target operational level of the combined cycle power plant 150 within the predefined period of time and fulfilling the grid authorities' requirements related to the primary frequency response of power plants.

Figure 6:
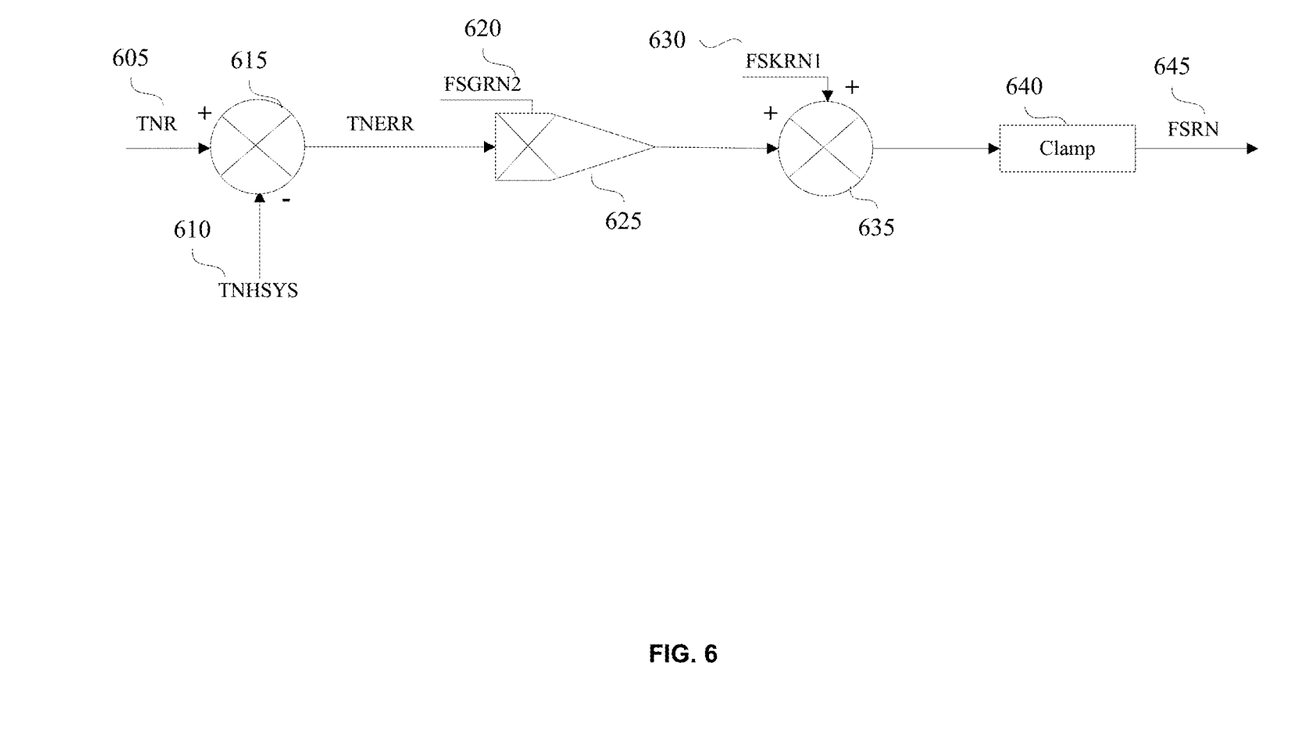
FIG. 6 is a schematic depiction of a transient load control portion of a controller, in accordance with an embodiment of the disclosure.

FIG. 6 is a schematic depiction of the transient load control portion of a controller, in accordance with an embodiment of the disclosure. To control fuel flow of a gas turbine, a reference speed (TNR) 605 of a generator shaft may be combined with an actual speed (TNHSYS) 610 of the generator shaft. A comparator 615 may generate a difference signal indicative of a difference signal between the reference speed 605 and the actual speed 610. The difference signal may be amplified at amplifier unit 625 by a fuel droop governor gain signal (FSGRN2) 620. The fuel droop governor gain signal 620 may be a variable signal and not a fixed constant signal as in conventional systems. The fuel droop governor gain signal 620 may vary due to adding a variable compensation value represented by a transient droop bias.

Figure 7:
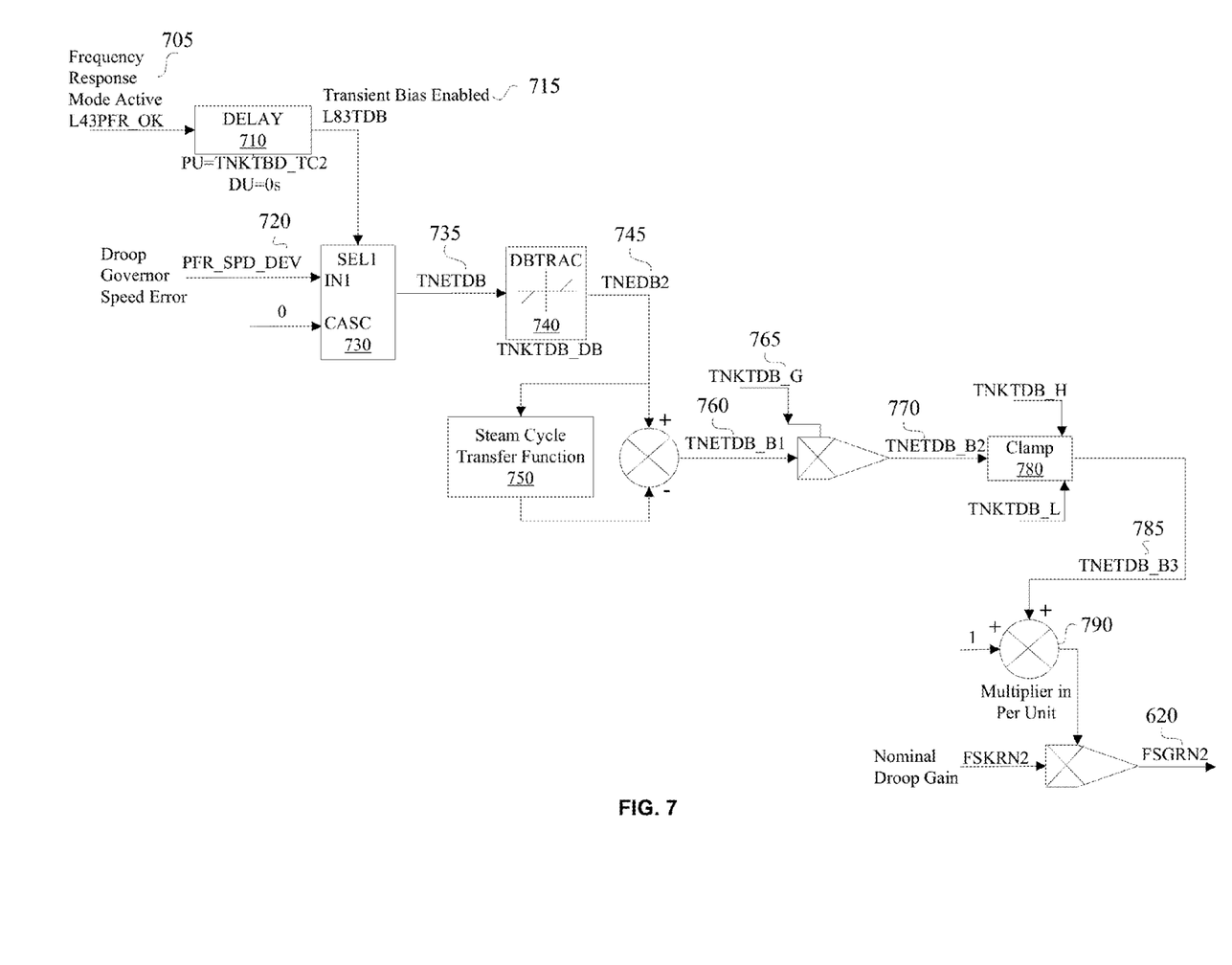
FIG. 7 is a schematic depiction of fuel droop governor gain generation with a compensation signal added, in accordance with an embodiment of the disclosure.

FIG. 7 illustrates generating the fuel droop governor gain signal 620 by the droop response acceleration engine 160. Upon activation of a primary frequency regulation mode 705, a delay unit 710 may be used to calculate and apply a time constant related to a steam turbine delay in a combined cycle power plant. An enabling signal (L83TDB) 715 may be passed to a selection unit 730, where it is processed based on a grid frequency deviation (PFR_SPD_DEV) 720. If the enabling signal 715 is generated (true), the grid frequency deviation 720 may be equal to a bias output signal (TNETDB) 735. If false, the bias output signal 735 may be equal to zero. The bias output signal 735 may be then submitted to a deadband block 740 that may filter out the bias output signals 735 based on a predetermined value. If the bias output signal 735 exceeds the predetermined value, it may pass through the deadband block 740 and become a filtered signal (TNEDB2) 745. The filtered signal 745 may subtract the response characteristic transfer function of the steam cycle (f, steam cycle) 750, which creates a transient bias (TNETDB_B1) 760. The transient bias 760 may be equal to zero in a steady state.

The transient bias 760 may be amplified by a bias scale gain signal (TNKTDB_G) 765 and the amplified signal (TNETDB_B2) 770 may be passed to a clamp unit 780. The clamp unit 780 may apply maximum and minimum authority limits. A limited bias (TNETDB_B3) 785 may be then multiplied by a multiplier 790 and amplified by a governor gain constant (FSKRN2). The resulting signal may represent the fuel droop governor gain signal (FSGRN2) 620 with a variable compensation signal added.

The fuel droop governor gain signal (FSGRN2) 620 may be represented by the following formula: FSGRN2=(1+ TNETDB_B3)*FSKRN2, where TNETDB_B3 is a bias output signal after some processing, and FSKRN2 is a fixed constant for droop governor gain. The fuel droop governor gain signal 620 may then be passed to a standard droop governor and used to calculate the fuel command (FSRN) 645.

Figure 8:
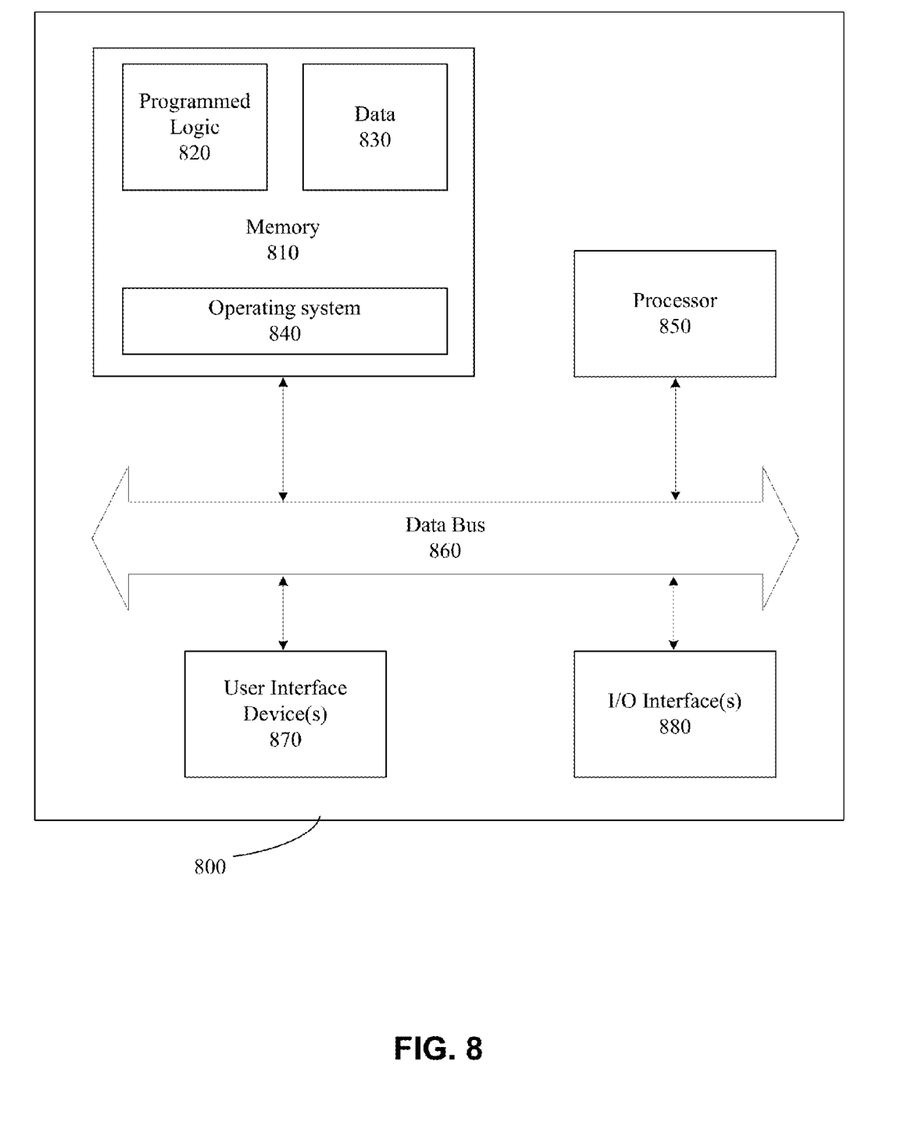
FIG. 8 is a block diagram illustrating a controller for controlling a turbine, in accordance with an embodiment of the disclosure.

FIG. 8 depicts a block diagram illustrating a controller 800 for controlling a combined cycle power plant to accelerate its droop response, in accordance with an embodiment of the disclosure. More specifically, the elements of the controller 800 may be used to calculate and apply a variable compensation signal to compensate for a delay of a steam cycle of a combined cycle power plant. The controller 800 may include a memory 810 that stores programmed logic 820 (e.g., software) and may store data 830, such as frequency variation data, data on a target operational level of the combined cycle power plant, data on a droop response associated with the target operational level, data on a variable compensation signal, and the like. The memory 810 also may include an operating system 840. A processor 850 may utilize the operating system 840 to execute the programmed logic 820, and in doing so, may also utilize the data 830. A data bus 860 may provide communication between the memory 810 and the processor 850. Users may interface with the controller 800 via at least one user interface device 870, such as a keyboard, mouse, control panel, or any other devices capable of communicating data to and from the controller 800. The controller 800 may be in communication with the combined cycle power plant online while operating, as well as in communication with the combined cycle power plant offline while not operating, via an input/output (I/O) Interface 880. More specifically, one or more of the controllers 800 may carry out the execution of the model-based control system, such as, but not limited to, receiving frequency variation data associated with a frequency variation of an electrical grid; based on the frequency variation data, determining a target operational level of the combined cycle power plant; calculating a variable compensation value; and applying the variable compensation value to the droop response until the target operational level is reached. Additionally, it should be appreciated that other external devices or multiple other combined cycle power plants may be in communication with the controller 800 via the I/O interface 880. In the illustrated embodiment, the controller 800 may be located remotely with respect to the combined cycle power plant; however, it may be co-located or even integrated with the combined cycle power plant. Further, the controller 800 and the programmed logic 820 implemented thereby may include software, hardware, firmware, or any combination thereof. It should also be appreciated that multiple controllers 800 may be used, whereby different features described herein may be executed on one or more different controllers 800.

Accordingly, embodiments described herein allow accelerating a response of a combined cycle power plant to frequency changes by calculating and adding a variable compensation value to the droop response of the combined cycle power plant. The variable compensation value may be calculated so that it compensates for the inherent time delayed response of the steam cycle to frequency variations. Thus, when the variable compensation value is applied, the droop target may be achieved throughout the response range defined by the grid authority.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for accelerating a droop response in a combined cycle power plant, the method comprising:
   receiving frequency variation data associated with a frequency variation of an electrical grid;
   based at least in part on the frequency variation data, determining a target operational level of the combined cycle power plant and the droop response associated with the target operational level;
   calculating a variable compensation value; and
   applying the variable compensation value to the droop response until the target operational level is reached, wherein the variable compensation value is applied to the droop response by a droop governor and adjusts a fuel droop governor gain.

2. The method of claim 1, wherein the combined cycle power plant comprises a gas turbine and a steam turbine.

3. The method of claim 1, wherein the variable compensation value is calculated to compensate a delay of a steam turbine.

4. The method of claim 1, wherein the variable compensation value comprises a transient bias, the transient bias being a signal for compensation of a delay of a steam turbine.

5. The method of claim 1, wherein the combined cycle power plant is controlled by a droop governor connected to the electrical grid.

6. The method of claim 1, wherein the variable compensation value is applied to the droop response by the droop governor of the combined cycle power plant.

7. The method of claim 1, wherein the variable compensation value is calculated to reach, by the combined cycle power plant, the target operational level in a predetermined period of time.

8. The method of claim 1, wherein the variable compensation value is calculated to accelerate the droop response of the combined cycle power plant, wherein the droop response of the combined cycle power plant is accelerated in proportion to the frequency variation.

9. The method of claim 1, further comprising dead band filtering of the frequency variation based at least in part on a predetermined value.

10. A system for accelerating a droop response in a combined cycle power plant, the system comprising:
   a controller;
   a processor communicatively coupled to the controller and configured to:
      receive frequency variation data associated with a frequency variation of an electrical grid;
      based at least in part on the frequency variation data, determine a target operational level of the combined cycle power plant and the droop response associated with the target operational level;
      calculate a variable compensation value; and
      apply the variable compensation value to the droop response until the target operational level is reached, wherein the variable compensation value is applied to the droop response by a droop governor and adjusts a fuel droop governor gain.

11. The system of claim 10, wherein the combined cycle power plant comprises a gas turbine and a steam turbine.

12. The system of claim 10, wherein the variable compensation value is calculated to compensate a delay of a steam turbine.

13. The system of claim 10, wherein the variable compensation value comprises a transient bias.

14. The system of claim 10, wherein the combined cycle power plant is controlled by a droop governor connected to a grid.

15. The system of claim 10, wherein the processor is further configured to combine the variable compensation value with the droop response, the combination being applied by a droop governor of the combined cycle power plant.

16. The system of claim 15, wherein the combination is calculated to achieve the target operational level in a predetermined period of time.

17. The system of claim 10, wherein the variable compensation value is calculated to accelerate the combined cycle power plant in proportion to the frequency variation, based at least in part on a steam turbine response rate.

18. The system of claim 10, wherein the variable compensation value and the droop response by the droop governor of the combined cycle power plant are applied to adjust the fuel governor droop gain.

19. A combined cycle power generation system, the system comprising:
   a gas turbine;
   a steam turbine;
   a generator;
   a controller in communication with a droop governor and a droop response accelerator; and
   a processor in communication with the controller and configured to:
      receive frequency variation data associated with a frequency variation;
      filter the frequency variation data using a dead band based at least in part on a predetermined value;
      based at least in part on the frequency variation data, determine a target operational level of the gas turbine and the steam turbine;
      calculate a transient bias for compensation of a delayed response of the steam turbine;
      generate the transient bias based at least in part on the calculation; and
      combine the transient bias with a signal representing operation of the gas turbine and the steam turbine until the target operational level is reached, wherein the transient bias is applied to
   the droop response by the droop governor and adjusts a fuel droop governor gain.

* * * * *